United States Patent
Bennour et al.

(10) Patent No.: US 10,316,227 B2
(45) Date of Patent: Jun. 11, 2019

(54) REACTIVE HOT MELT ADHESIVE COMPOSITION

(71) Applicant: H.B. Fuller Company, St. Paul, MN (US)

(72) Inventors: Haythem Bennour, Hiboun Mahdia (TN); Annett Linemann, Saarbrücken (DE)

(73) Assignee: H.B. Fuller Company

( * ) Notice: Subject to any disclaimer, the term of this patent is extended or adjusted under 35 U.S.C. 154(b) by 107 days.

(21) Appl. No.: 15/467,651

(22) Filed: Mar. 23, 2017

(65) Prior Publication Data

US 2017/0275512 A1 Sep. 28, 2017

Related U.S. Application Data

(60) Provisional application No. 62/312,119, filed on Mar. 23, 2016.

(51) Int. Cl.
| | |
|---|---|
| *C08G 18/10* | (2006.01) |
| *C09J 175/06* | (2006.01) |
| *C08G 18/28* | (2006.01) |
| *C08G 18/32* | (2006.01) |
| *C08G 18/42* | (2006.01) |
| *C08G 18/76* | (2006.01) |
| *C09J 175/08* | (2006.01) |

(52) U.S. Cl.
CPC ............ *C09J 175/06* (2013.01); *C08G 18/10* (2013.01); *C08G 18/2825* (2013.01); *C08G 18/3206* (2013.01); *C08G 18/42* (2013.01); *C08G 18/7671* (2013.01); *C09J 175/08* (2013.01); *C08G 2170/20* (2013.01)

(58) Field of Classification Search
CPC ......... C09J 175/06; C08G 18/10; C08G 18/42
See application file for complete search history.

(56) References Cited

U.S. PATENT DOCUMENTS

| | | |
|---|---|---|
| 5,906,704 A | 5/1999 | Matsuura et al. |
| 6,280,561 B1 | 8/2001 | McInnis et al. |
| 6,515,164 B1 | 2/2003 | Bolte et al. |
| 6,784,242 B2 | 8/2004 | Huebener et al. |
| 6,809,171 B2 | 10/2004 | Bolte et al. |
| 6,884,904 B2 | 4/2005 | Smith et al. |
| 7,129,312 B1 | 10/2006 | Krebs et al. |
| 2004/0162385 A1 | 8/2004 | Krebs |
| 2004/0259968 A1* | 12/2004 | Krebs ............... C08G 18/10 521/170 |
| 2005/0032973 A1 | 2/2005 | Krebs et al. |
| 2005/0137375 A1* | 6/2005 | Hansen ............ C08G 18/0823 528/44 |
| 2009/0012258 A1 | 1/2009 | Shimoma et al. |

FOREIGN PATENT DOCUMENTS

| | | |
|---|---|---|
| EP | 1338635 | 6/2008 |
| EP | 2 894 181 | 7/2015 |
| WO | WO2001/040342 | 6/2001 |
| WO | WO2003/006521 | 1/2003 |
| WO | WO2003/051951 | 6/2003 |
| WO | WO2003/055929 | 7/2003 |
| WO | WO2003/066700 | 8/2003 |
| WO | WO2005/033164 | 4/2005 |
| WO | WO2008064936 | 6/2008 |

* cited by examiner

*Primary Examiner* — Hannah J Pak
(74) *Attorney, Agent, or Firm* — Kirsten Stone

(57) ABSTRACT

The present invention relates to a process for preparing a reactive hotmelt adhesive formulation having a low residual content of monomeric diisocyanate. The present invention further provides a reactive hotmelt adhesive composition obtainable by the process of the invention.

19 Claims, No Drawings

US 10,316,227 B2

REACTIVE HOT MELT ADHESIVE COMPOSITION

CROSS-REFERENCE TO RELATED APPLICATIONS

This application claims the benefit of U.S. Provisional Application Ser. No. 62/312,119 filed on Mar. 23, 2016, Which is incorporated herein.

FIELD OF THE INVENTION

The present invention relates to a process for preparing a reactive hotmelt adhesive formulation having a low residual content of monomeric diisocyanate. The present invention further provides a reactive hotmelt adhesive composition obtainable by the process of the invention.

BACKGROUND OF THE INVENTION

Moisture curing polyurethane based hotmelt adhesive compositions (HMMC) are well known in the art. HMMC adhesives are typically based on isocyanate-terminated prepolymers. The NCO-terminated prepolymer reacts in the presence of water, e.g. air humidity, to form urea-based adhesive bonds, while $CO_2$ is eliminated. Suitable NCO-terminated prepolymers may be obtained by reacting isocyanate-reactive polymers such as a polyol with a molar excess of multifunctional isocyanate agents such as a monomeric diisocyanate. However, significant amounts of monomeric diisocyanate normally remain in the NCO-terminated prepolymer, which leads to health issues. Therefore, the residual amount of monomeric diisocyanate in the NCO-terminated prepolymer has to be reduced to less than 1% or lower. This can be done, e.g., by stripping, which is a costly and time consuming additional purification step. In view of this, attempts have been made to find more efficient and convenient procedures to reduce the amount of residual monomeric diisocyanate in NCO-terminated prepolymers.

WO 2003/055929 A1, WO 2003/051951 A1, WO 2003/066700 A1, WO 2003/006521 A1, WO 2001/040342 A1 or WO 2005/033164 A1 describe the preparation of reactive polyurethanes having a low content of monomeric diisocyanate by using asymmetrical diisocyanates such as 2,4'-MDI.

EP 1338635A discloses a polyurethane compositions with low content of diisocyanate monomers obtained by reacting at least one isocyanate-reactive monomer with an excess of molten monomeric diisocyanate to produce at least one reaction product having a maximum of 0.5 wt % of free isocyanate groups.

EP 2894181A describes a foaming polyurethane composition with low residual monomeric diisocyanate obtained by blending isocyanate component, a propellant, monofunctional alcohol, a catalyst, a stabilizer and one or more polymeric polyols.

US 2004/0162385 describes the production of a reactive polyurethane by reacting 2,4-MDI with propyleneglycol and then subsequently adding polyester polyol and 4,4'-MDI.

SUMMARY OF THE INVENTION

The object of the present invention is the provision of a polyurethane based reactive hotmelt adhesive composition having a very low content of residual monomeric diisocyanate without requiring complicated and/or additional purification steps. A further object of the present invention is that the reduction in residual monomeric diisocyanate content should not affect the viscosity of the resulting adhesive in an unfavorable way.

The inventors of the present invention have found that the content of monomeric diisocyanate in isocyanate-terminated prepolymers known for use in the preparation of hotmelt adhesives can be significantly reduced by reacting the isocyanate-terminated prepolymer with a mixture of monofunctional and multifunctional isocyanate-reactive compounds, typically in minor amounts. In addition, the treatment does not result in the loss of too much isocyanate functionality and does not affect the viscosity in an unfavorable way. In view of this, the present invention relates to a process for preparing a reactive hotmelt formulation, wherein the process comprises a step of:

reacting a NCO-terminated prepolymer with a mixture of:
(a) a monofunctional compound (M) having a molecular weight of less than 400 g/mol and having one functional group, selected from primary, secondary or tertiary hydroxyl, primary, secondary or tertiary amine, primary, secondary or tertiary thiol, or carboxylic acid; and
(b) a multifunctional compound (D) having a molecular weight of less than 400 g/mol and having at least two functional groups, wherein each functional group is independently selected from primary, secondary or tertiary hydroxyl, primary or secondary amine, primary, secondary or tertiary thiol, or carboxylic acid.

The mixture of monofunctional compound (M) and multifunctional compound (D) is present in the reaction in an amount of 0.1 to 10% by weight, based on the total weight of the composition. Furthermore, the weight ratio MID of monofunctional compound (M) to multifunctional compound (I)) is in the range of 0.5 to 10.

In addition, the present invention provides adhesive compositions obtainable by means of the above process.

Further embodiments of the present invention are described in the following detailed description or in the appended claims.

DETAILED DESCRIPTION OF THE PRESENT INVENTION

As outlined above, the process for preparing a reactive hotmelt formulation according to the present invention comprises the step of reacting a NCO-terminated prepolymer with a mixture of a monofunctional compound (M) and a multifunctional compound (D) having reactivity towards isocyanate groups.

The isocyanate-reactive functional group of the monofunctional compound (M) is selected from hydroxyl, such as primary, secondary or tertiary hydroxyl, amine, such as primary, secondary or tertiary amine, thiol, such as primary, secondary or tertiary thiol, or a carboxylic acid group. In one aspect or the invention, the monofunctional compound (M) is an alcohol. For example, the monofunctional compound (M) may be a primary alcohol.

The remaining backbone of the monofunctional compound (M) is not particularly important the context of the present invention and can be selected from an organic group, preferably hydrocarbon group such as branched or non-branched, aromatic or aliphatic hydrocarbon, more preferably non-branched aliphatic hydrocarbon. In one aspect, the monofunctional compound (M) is terminated with a silane group on the end's opposite the isocyanate functional group.

The monofunctional compound (M) is a low molecular weight compound. Thus, the monofunctional compound (M)

has a molecular weight of less than 400 g/mol or less. In one aspect of the invention, the monofunctional compound (M) has a molecular weight of 300 g/mol or less. For example, the monofunctional compound (M) may have a molecular weight of 200 g/mol or less.

Illustrative examples of monofunctional compound (M) include but are not limited to primary alcohols having up to 12 carbon atoms such as hexanol and amino silanes (e.g. bis-(3 trimethoxysilylpropyl) amine, commercialized as SILQUEST A 1170 (Momentive Performance Materials) and as DYNASYLAN 1124 (Evonik industries)).

The multifunctional compound (D) has at least two isocyanate-reactive groups. The isocyanate-reactive functional groups of the multifunctional compound (D) are independently selected from hydroxyl, such as primary, secondary or tertiary hydroxyl, amine, such as primary or secondary, thiol, such as primary, secondary or tertiary thiol, or a carboxylic acid group. However, the isocyanate-reactive groups are not necessarily the same in one compound but can be different such as in an amino acid. For example, the functional groups in the multifunctional compound (D) may be hydroxyl groups, such as primary hydroxyl groups.

In one aspect, the multifunctional compound (D) has two isocyanate-reactive groups.

The remaining backbone of the multifunctional compound (D) is not particularly important context of the present invention and can be selected from an organic group, preferably hydrocarbon group such as branched or unbranched, aromatic or aliphatic hydrocarbon, more preferably unbranched aliphatic hydrocarbon.

Furthermore, also the multifunctional compound (D) is a low molecular weight compound. Thus, the multifunctional compound (D) has a molecular weight of less than 400 g/mol. For example, the monofunctional compound (M) may have a molecular weight of 300 g/mol or less. According to another aspect of the invention, the monofunctional compound (M) has a molecular weight of 200 g/mol or less, preferably 100 g/mol or less, such as 75 g/mol or less.

Illustrative examples of multifunctional compound (D) include but are not limited to primary dialcohols having up to 12 carbon atoms such as ethyleneglycol or butane diol.

The mixture of monofunctional compound (M) and multifunctional compound (D) is added typically in minor stoichiometric amounts relative to the NCO functionality, to not loose too much of the isocyanate functionality of the prepolymer. Thus, the mixture of monofunctional compound (M) and multifunctional compound (D) can be present in an amount of 0.1 to 10% by weight, based on the total weight of the composition. For example, the mixture of monofunctional compound (M) and multifunctional compound (D) is present in an amount of 0.5 to 5% by weight. According to an illustrative aspect of the invention, the mixture is present in an amount of 0.75 to 4% by weight, based on the total weight of the composition. In another illustrative aspect, the mixture is present in an amount of 1 to 3% by weight, such as 1 to 2% by weight. Preferably, the mixture of monofunctional compound (M) and multifunctional compound (D) is used in stoichiometric amounts with respect to the excess of monomeric diisocyanate contained in the NCO-terminated prepolymer.

The weight ratio M/D of monofunctional compound (M) to multifunctional compound (D) is according to the present invention in the range of 0.5 to 10. If the ratio of monofunctional compound (M) is too low, hotmelt adhesive compositions having a suitable viscosity cannot be obtained. If the ratio of monofunctional compound (M) is too high, the loss of isocyanate functionality in the NCO-terminated prepolymer is unacceptably high. According to one aspect, the weight ratio M/D of monofunctional compound (M) to multifunctional compound (D) is in the range of 0.5 to 8. According to another aspect, the weight ratio M/D of monofunctional compound (M) to multifunctional compound (D) is in the range of 0.8 to 5. For example, the weight ratio M/D of monofunctional compound (M) to multifunctional compound (D) is in the range of 1.0 to 1.8, such as 1.1 to 1.5.

According to the present invention, the step of reacting a NCO-terminated prepolymer with a mixture of monofunctional compound (M) and multifunctional compound (D) can be carried out in various ways. For example, a premixed mixture of monofunctional compound (M) and multifunctional compound (D) may be added to the NCO-terminated prepolymer. Alternatively, the monofunctional compound (M) and multifunctional compound (D) may be added separately but simultaneously. In a further embodiment, the monofunctional compound (M) and multifunctional compound (D) are added sequentially, one after the other, wherein monofunctional compound (M) and multifunctional compound (D) are added within 20 min, preferably within 10 min, more preferably within 5 min, or even within 3 minutes. The time span until which the components can be added to the prepolymer may depend on the batch size, but is usually within the above time ranges independent of the batch size.

The reaction of NCO-terminated prepolymer with the mixture of monofunctional compound (M) and multifunctional compound (D) may be carried out at a reaction temperature of 150° C. or less. According to one aspect, the reaction is carried out at a temperature of 130° C. or less. In another aspect, the reaction is carried out at a temperature of 80° C. to 150° C., or even at a temperature of 115° C. to 125° C.

The NCO-terminated prepolymer to be employed in the inventive process is not specifically limited. Typical NCO-terminated prepolymers known for use in the preparations of polyurethane based reactive hotmelt adhesives and commercially available on the market can be used. The NCO-terminated prepolymer may be obtained by reacting at least one polymer or prepolymer (P) having end groups, selected from hydroxyl, primary amine, secondary amine, thiol, or carboxylic acid, with a molar excess of monomeric diisocyanate. Suitable diisocyanates are well known in the art and include for example toluene diisocyanate (TDI) or methylene diphenyl diisocyanate (MDI). The monomeric diisocyanates may be assymmetric or symmetric, the latter being preferred. An example of a suitable symmetric diisocyanate is 4,4'-MDI. The monomeric diisocyanate can partly be replaced by a diisocyanate prepolymer as well as by polymeric or higher functional isocyanates.

The polymer or prepolymer (P) is present in an amount of 15 to 95% by weight, based on the total weight of the composition. For example, the polymer or prepolymer (P) is present in an amount of 50 to 93% by weight. According to another aspect, the polymer or prepolymer (P) is present in an amount of 75 to 90% by weight.

Suitable polymers or prepolymers (D) are well known in the art. For example, a polyol, such as a polyester polyol, polyether polyol or polyester-polyether polyol, may be used. According to one aspect, the polymer or prepolymer (P) has a molecular weight of 200 to 100,000 g/mol.

After reducing the amount of monomeric diisocyanate in the NCO-terminated prepolymer by reacting with the mixture of monofunctional compound (M) and multifunctional compound (D), a multifunctional isocyanate agent having an isocyanate functionality of more than 2, or even more than 3, may be added to the composition to provide some degree of crosslinking. Such further multifunctional isocyanate agent added after the reaction with the mixture of compound (M) and (D) has typically a low monomeric diisocyanate content. Suitable examples include HDI isocyanurate trimer such as Desmodur N3300.

The adhesive can further include a catalyst. Suitable catalysts facilitate the reaction between the polyol and polyisocyanate, hydrolysis, and/or the subsequent crosslinking reaction of the silane groups, isocyanate groups, or a combination thereof. Useful catalysts include, e.g., 2 2-dimorpholinodiethylether (DMDEE), tertiary amines including, e.g., N,N-dimethylaminoethanol, N,N-dimethyl-cyclohexamine-bis(2-dimethyl aminoethyl)ether, N-ethylmorpholine, N,N,N',N',N''-pentamethyl-diethylenetriamine, and 1-2(hydroxypropyl) imidazole, and metal catalysts including, tin (e.g., dialkyl tin dicarboxylates, e.g., dibutyl tin dilaurate and dibutyl tin diacetate, stannous salts of carboxylic acids, e.g., stannous octoate and stannous acetate, tetrabutyl dioleatodistannoxane), titanium compounds, bismuth carboxylates, organosilicon titanates, alkyltitantates, and combinations thereof. The reactive hot melt adhesive composition can include more than one catalyst.

The present invention also relates to adhesive compositions obtainable by the process according to the invention. The adhesive composition typically has a low residual content of monomeric diisocyanate, such as less than 1% by weight. In one embodiment, the adhesive composition has a residual content of monomeric diisocyanate of 0.5% by weight or less, such as 0.3% by weight or less. Due to a higher surface/mass ratio and an exothermal mass effect, the reaction will be more complete on higher scales/larger batch sizes. Therefore, the present invention is suitable to provide adhesive compositions having a residual content of monomeric diisocyanate of 0.1% by weight or less on an industrial scale.

In accordance with the present invention, the viscosity of the adhesive composition can be adjusted as desired and is not specifically limited. For example, the adhesive composition may have a viscosity measured at 150° C. of 150,000 mPas or less. According to another aspect of the invention, the adhesive composition has a viscosity at 150° C. of 120,000 mPas or less. In an illustrative embodiment, the adhesive composition has a viscosity at 150° C. of 10,000 to 100,000 mPas, or even a viscosity of 20,000 to 75,000 mPas.

Furthermore, in certain embodiments, the adhesive composition has a viscosity's stability as defined in the examples section of 15%/h or lower. Lower numerical values indicate a higher stability, i.e. a low value means that the viscosity increase is small. In preferred embodiments, the adhesive composition has a viscosity's stability of 10%/h or lower.

The adhesive composition according to the present invention may also include non-reactive components. Typical examples of suitable non-reactive material include ethylene vinyl acetate (EVA), thermoplastic polyurethane (TPU), amorphous poly-alpha-olefin (APAO), thermoplastic elastomer (TPE), such as olefinic thermoplastic elastomers (TPO or TPES) or thermoplastic amide (TPA), resin, such as phenol-formaldehyde resin, wax, tackifying resin, talcum, calcium carbonate and pigment (e.g. carbon black or titanium dioxide). Non-reactive material may be included, e.g., in an amount of up to 50% by weight, based on the total weight of the composition. According to another aspect, non-reactive material is included in an amount of 1 to 10% by weight.

Thus, the adhesive composition according to the present invention essentially is a HMMC having a residual content of monomeric diisocyanate of less than 1% by weight (referring to the total composition), preferably 0.3% by weight or less, and a viscosity measured at 150° C. of 150,000 mPas or less, preferably 30,000 to 100,000 mPas, and comprising at least 50% by weight, based on the total weight of the composition, preferably at least 90% by weight of an isocyanate-terminated prepolymer, wherein the isocyanate terminated prepolymer is partially end-capped or bridged by organic groups, such as hydrocarbon chains. Partial end-capping or bridging of isocyanate-terminated prepolymer origins from treatment with the mixture of monofunctional compound (M) and multifunctional compound (D) employed for reducing the residual content of monomeric diisocyanate. The treatment is done such that the isocyanate functionality of the composition is not affected in an unfavorable way so that the composition is still able to crosslink, i.e. compounds M and D are used in minor amounts to leave sufficient free residual isocyanate groups in the prepolymer.

Alternatively or additionally, the adhesive composition according to the present invention may be defined as comprising a NCO-terminated prepolymer as a major component and various modified diisocyanate monomers. For example, in case the monofunctional compound (M) is a monool and the multifunctional compound (D) is a diol, the adhesive composition according to the present invention will comprise at least some of the following structural units detectable by NMR and/or MS:

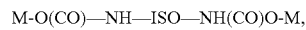

M-O(CO)—NH—ISO—NH(CO)O-M,

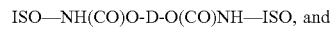

ISO—NH(CO)O-D-O(CO)NH—ISO, and

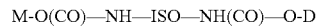

M-O(CO)—NH—ISO—NH(CO)—O-D wherein M is the backbone of the monool (M), D is the backbone of the diol (D) and ISO is the backbone of the monomeric diisocyanate.

Thus, in case the monomeric diisocyanate is 4,4'-MDI, the monol (M) is hexanol, and the diol (D) is ethylene glycol, the adhesive composition according to the present invention will comprise at least the following structures, detectable by NMR or MS:

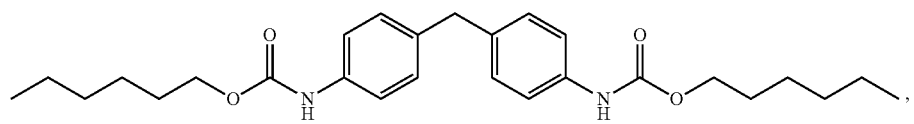

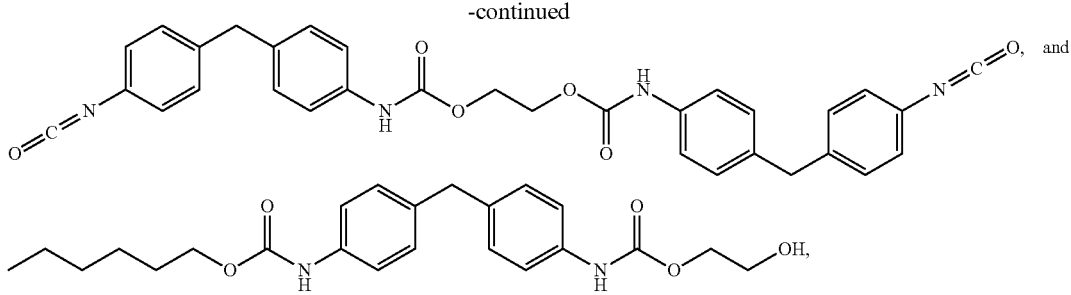

The reactive hotmelt adhesive composition of the present invention can be employed in all uses commonly known for HMMC adhesives such as use in assembly, textiles, woodworking, automobiles, etc.

EXAMPLES

The viscosity is determined according to method DIN 53019 at 150° C. using a Brookfield Thermoset System with a spindle 29 and a spindle speed of 5 rpm.

Viscosity's stability is a measure for the viscosity increase of the composition and is calculated as the difference of the viscosity value of a sample (i.e. 200 g) after 20 hours storage at 120° C. in an oven, without protective gas, but with exposure to the atmosphere (humidity), minus the viscosity value measured at time=0, the result thereof divided by the viscosity value at time=0, and the result again divided by 20h, and is expressed in %/h.

NCO content in % is determined according to DIN EN ISO 11909.

NCO/OH ratio is calculated based on the stoichiometric ratio of the total weight percent of functional NCO groups (Mn=42 g/mol) versus the total weight percent of OH groups (OH value, expressed as KOH equivalents, Mn=56 g/mol) in the composition.

Open time is determined according to an in-house method (paper method) using a 500 μm film at 80° C. The procedure is the same for both working examples and comparative examples.

Shore A hardness is determined according to DIN 53505.

Tensile strength is determined according to DIN 53504 using a speed of 200 mm/min and samples of 500 μm thickness cured after 7 day at defined climate (23° C., 50% relative humidity).

The amount of residual diisocyanate monomer is determined by HPLC.

Materials:

The following materials were used in the below examples:
Polyols:
Dynacoll 7140
Dynacoll 7381
Dynacoll 7230
Monomeric Diisocyanate:
4,4'- Methylendiphenylisocyanate (44MDI), such as Desmodur 44 M, available from Covestro.
Monofunctional Alcohol:
1-Hexanol (Mw=102.18 g/mol)
Nafol 2428 is a blend of linear even numbered primary alcohols in the range $C_{24}$-$C_{28}$ available from Sasol Performance Chemicals.
Difunctional Alcohol:
Butane diol (Mw=90.12 g/mol)
Ethyleneglycol (Mw=62.07 g/mol)
Other Materials:
Pearlbond 521 and 503 are thermoplastic polyurethanes (TPU) available from Merquinsa.
EVATANE 28-800 is a random copolymer of ethylene and vinyl acetate available from Arkema.
Desmodur N3300 and Eco 7300 are isocyanate-terminated prepolymers available from Covestro
Comparative example CE1 is based on the commercial product Ipatherm S14/176 UV, which is a NCO-terminated prepolymer available from HB Fuller.

General Procedure:

Isocyanate-reactive polymers as indicated in the below table 1 are reacted with monomeric diisocyanate in the amounts given in table 1 at 120° C. under vacuum for at least 30 minutes. Subsequently, a mixture of monofunctional alcohol and difunctional alcohol is added at the same temperature. After about 45 minutes reaction time a further isocyanate-terminated prepolymer was added where indicated.

The numerical values in the below table 1 refer to weight percent based on a total of 100% by weight, the balance being minor amounts of usual additives.

TABLE 1

|  | IE1 | IE2 | IE3 | IE4 | IE5 |
| --- | --- | --- | --- | --- | --- |
| Dynacoll 7140 | 39.17 | 38.1 | 38.1 | 38.1 | 19.57 |
| Dynacoll 7381 | 19.6 | 19.07 | 19.07 | 19.07 | 37 |
| Dynacoll 7230 | 28.6 | 27.82 | 27.82 | 27.62 | 27.92 |
| Butanediol | 0.9 | 0.85 | — | — | — |
| Ethyleneglycol | — | — | 0.65 | 0.75 | 0.75 |
| Hexanol | 1.3 | 1.26 | 1 | 1.1 | 1.1 |
| 44MDI | 11.45 | 11.14 | 11.14 | 11.14 | 11.5 |
| Desmodur Eco 7300 | 0.5 | 1 | 1.46 | 1.46 | 1.4 |

The obtained results are reported in the below table 2.

TABLE 2

|  | CE1 | IE1 | IE2 | IE3 | IE4 | IE5 |
| --- | --- | --- | --- | --- | --- | --- |
| Viscosity [mPas] | 39700 | 78000 | 65000 | 55000 | 90000 | 52000 |
| NCO content [%] | 2.15 | 0.8 | 1.01 | 1.01 | 0.97 | 0.77 |
| NCO/OH ratio (before addition of M/D mixture) | — | 2.22 | 2.22 | 2.22 | 2.23 | 2.15 |

TABLE 2-continued

|  | CE1 | IE1 | IE2 | IE3 | IE4 | IE5 |
|---|---|---|---|---|---|---|
| Open time [s] | 40 | 10-20 | 10-20 | 10-20 | 10-20 | 10-15 |
| Shore A after 30 min | 11 | 40 | 38 | 31 | 35 | 70 |
| Shore A after 1 h | 21 | 51 | 43 | 44 | 48 | 79 |
| Tensile strength after 1 d [MPa] | 5.45 | 3.4 | 5 | 5.33 | 7.23 | 6.34 |
| Tensile strength after 7 d [MPa] | 28.48 | 13.65 | 12.6 | 16.5 | 15.52 | 16.4 |
| Viscosity's stability [%/h] | — | 5.7 | 4.4 | 7.3 | 2.9 | 11.1 |
| Residual MDI [%] | 3.43* | 0.272 | 0.267 | 0.351 | 0.155 | 0.251 |

*calculated

As can be seen from the above results, reactive hot melt formulations can be obtained according to the present invention with a low content of residual monomeric diisocyanate, while the cohesive strength is sufficiently high and the viscosity increase is under control.

The invention claimed is:

1. A process for preparing a reactive hotmelt adhesive composition, the process comprising:
   reacting a NCO-terminated prepolymer with a mixture of:
   (a) a monofunctional compound (M) having a molecular weight of less than 400 g/mol and having one functional group selected from the group consisting of primary, secondary or tertiary hydroxyl; primary, secondary or tertiary amine; primary, secondary or tertiary thiol; and carboxylic acid; and
   (b) a multifunctional compound (D) having a molecular weight of less than 400 g/mol and having at least two functional groups, wherein each functional group is independently selected from the group consisting of primary, secondary or tertiary hydroxyl; primary or secondary amine; primary, secondary or tertiary thiol; and carboxylic acid; and
   wherein the mixture of monofunctional compound (M) and multifunctional compound (D) is present in an amount of 0.1 to 10% by weight, based on the total weight of the composition, and
   wherein the weight ratio M/D of monofunctional compound (M) to multifunctional compound (D) is in the range of 0.5 to 10.

2. The process according to claim 1, wherein the step of reacting a NCO-terminated prepolymer with a mixture of monofunctional compound (M) and multifunctional compound (D) is carried out by
   (a) adding a premixed mixture of monofunctional compound (M) and multifunctional compound (D); or
   (b) simultaneously adding monofunctional compound (M) and multifunctional compound (D); or
   (c) sequentially adding monofunctional compound (M) and multifunctional compound (D), wherein monofunctional compound (M) and multifunctional compound (D) are added within 20 min.

3. The process according to claim 1, further comprising at least one:
   wherein the mixture of monofunctional compound (M) and multifunctional compound (D) is present in an amount of 0.5 to 5% by weight based on the total weight of the composition and
   wherein the weight ratio M/D of monofunctional compound (M) to multifunctional compound (D) is in the range of 0.5 to 8.

4. The process according to claim 1, wherein the monofunctional compound (M) is an alcohol, has a molecular weight of 300 g/mol or less, or a combination thereof.

5. The process according to claim 1, wherein the multifunctional compound (D) comprises at least one of:
   the at least two functional groups are independently selected from the group consisting of primary, secondary and tertiary hydroxyl; and
   has a total of two functional groups; and
   has a molecular weight of 300 g/mol.

6. The process according to claim 1, wherein the reaction of NCO-terminated prepolymer with the mixture of monofunctional compound (M) and multifunctional compound (D) is carried out at a reaction temperature of 80° C. to 150° C.

7. The process according to claim 1, wherein the NCO-terminated prepolymer is obtained by reacting at least one polymer or prepolymer (P) having end groups, the end groups independently selected from the group consisting of hydroxyl, primary amine, secondary amine, thiol, and carboxylic acid, with monomeric diisocyanate, wherein the polymer or prepolymer (P) is present in an amount of 15 to 95% by weight, based on the total weight of the composition.

8. The process according to claim 7, wherein the polymer or prepolymer (P) comprises at least one of:
   is a polyol; and
   is present in an amount of 50 to 93% by weight; and
   has a molecular weight of 200 to 100000 g/mol.

9. The process according to claim 1 further comprising, after the step of reacting the NCO-terminated prepolymer with the mixture of monofunctional compound (M) and multifunctional compound (D), a step of adding a multifunctional isocyanate agent.

10. A reactive hotmelt adhesive composition obtained by the process according to claim 1.

11. The adhesive composition according to claim 10, wherein the adhesive composition has at least one of:
    a residual content of monomeric diisocyanate of less than 1% by weight; and
    a viscosity measured at 150° C. of 10,000 to 100,000 mPas; and
    a viscosity stability of 15%/h or lower.

12. The adhesive composition according to claim 10 further comprising a non-reactive material in an amount of up to 50% by weight.

13. The adhesive composition of claim 12 wherein the non-reactive material is selected from the group consisting of ethylene vinyl acetate (EVA), thermoplastic polyurethane (TPU), amorphous poly-alpha-olefin (APAO), thermoplastic elastomer (TPE), resin, wax, tackifiying resin, talcum, calcium carbonate and pigment.

14. A reactive hot melt adhesive composition derived from a mixture of:
    (a) a NCO-terminated prepolymer derived from a polyfunctional isocyanate having a functionality of about 2 or more and a polyol, (b) a monofunctional compound (M) having a molecular weight of less than 400 g/mol and having one functional group, selected from the group consisting of primary, secondary or tertiary hydroxyl; primary, secondary or tertiary amine; primary, secondary or tertiary thiol; and carboxylic acid; and (c) a multifunctional compound (D) having a molecular weight of less than 400 g/mol and having at least two functional groups, wherein each functional group is independently selected from the group consisting of primary, secondary or tertiary hydroxyl; primary or secondary amine; primary, secondary or tertiary thiol; and carboxylic acid;

wherein the total amount of monofunctional compound (M) in combination with the multifunctional compound (D) is present in an amount of 0.1 to 10% by weight, based on the total weight of the composition, and wherein the weight ratio M/D of monofunctional compound (M) to multifunctional compound (D) is in the range of 0.5 to 10.

15. The process according to claim 2, wherein the step of reacting a NCO-terminated prepolymer with a mixture of monofunctional compound (M) and multifunctional compound (D) is carried out by sequentially adding monofunctional compound (M) and multifunctional compound (D), wherein monofunctional compound (M) and multifunctional compound (D) are added within 10 min of each other.

16. The process according to claim 2, wherein the step of reacting a NCO-terminated prepolymer with a mixture of monofunctional compound (M) and multifunctional compound (D) is carried out by sequentially adding monofunctional compound (M) and multifunctional compound (D), wherein monofunctional compound (M) and multifunctional compound (D) are added within 5 min of each other.

17. The process according to claim 5, wherein the hydroxyl functional group comprises primary hydroxyl.

18. The process according to claim 8, wherein the polyol comprises at least one of polyester polyol, polyether polyol, and polyester-polyether polyol.

19. The adhesive composition of claim 11, wherein the adhesive composition has a viscosity stability of 10%/h or lower.

* * * * *